(12) United States Patent
Miyamura et al.

(10) Patent No.: US 9,994,169 B2
(45) Date of Patent: Jun. 12, 2018

(54) WIRE HARNESS

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Tetsuya Miyamura, Mie (JP); Yasuo Omori, Mie (JP)

(73) Assignees: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days. days.

(21) Appl. No.: 15/520,106

(22) PCT Filed: Nov. 11, 2015

(86) PCT No.: PCT/JP2015/081735
§ 371 (c)(1),
(2) Date: Apr. 19, 2017

(87) PCT Pub. No.: WO2016/076355
PCT Pub. Date: May 19, 2016

(65) Prior Publication Data
US 2017/0327059 A1 Nov. 16, 2017

(30) Foreign Application Priority Data

Nov. 14, 2014 (JP) ................................. 2014-231201

(51) Int. Cl.
*B60R 16/02* (2006.01)
*H02G 3/32* (2006.01)
*H01B 13/012* (2006.01)

(52) U.S. Cl.
CPC .......... *B60R 16/02* (2013.01); *H01B 13/012* (2013.01); *H02G 3/32* (2013.01)

(58) Field of Classification Search
CPC ......... B60R 16/02; H01B 13/012; H02G 3/32
USPC ..................................................... 174/72 A
See application file for complete search history.

(56) References Cited

U.S. PATENT DOCUMENTS 6,499,702 B2 * 12/2002 Kamekawa ......... B60R 16/0215
248/68.1
6,610,929 B1 8/2003 Motokawa

FOREIGN PATENT DOCUMENTS

| JP | S5643031 Y2 | 10/1981 |
|---|---|---|
| JP | 2000207947 A | 7/2000 |
| JP | 2001045636 A | 2/2001 |
| JP | 2001258137 A | 9/2001 |
| JP | 2001268752 * | 9/2001 |
| JP | 2012104258 A | 5/2012 |

* cited by examiner

*Primary Examiner* — Timothy Thompson
*Assistant Examiner* — Charles Pizzuto
(74) *Attorney, Agent, or Firm* — Reising Ethington, P.C.

(57) ABSTRACT

A wire harness and a method for manufacturing a wire harness. The wire harness includes a first wire harness to which a clamp is fixed at a predetermined position, and a second wire harness that is provided with a fitting portion into which the clamp can be fitted, and the second wire harness is attached to the first wire harness by fitting the clamp into the fitting portion.

4 Claims, 10 Drawing Sheets

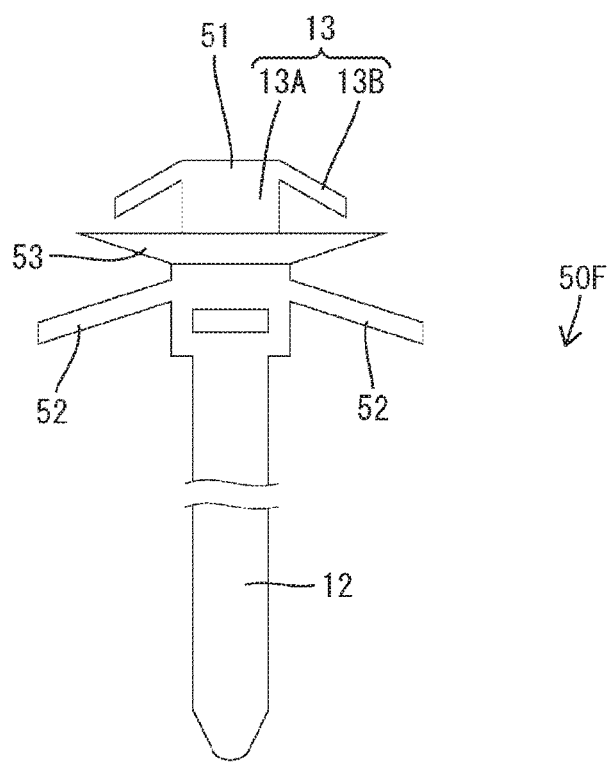
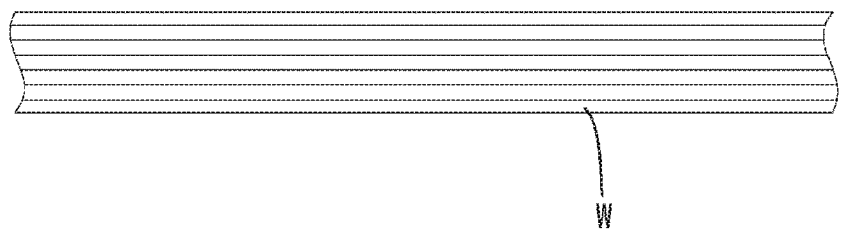
Figure 9

WIRE HARNESS

CROSS REFERENCE TO RELATED APPLICATIONS

This application claims the priority of Japanese patent application JP2014-231201 filed on Nov. 14, 2014, the entire contents of which are incorporated herein.

TECHNICAL FIELD

The present invention relates to a wire harness.

BACKGROUND ART

Conventionally, wire harnesses that are to be arranged in, for example, vehicles and the like are assembled on an assembly drawing plate on which instructions regarding the lengths of electric wires and connectors for connecting the wires, and instructions regarding mounting of exterior components such as corrugated tubes and protectors, and the like are indicated (see Patent Document 1 below, JP 2012-104258A). Based on an assembly drawing on the assembly drawing plate, an assembly operator lays out electric wires, bands the laid out electric wires together into a bundle, connects electric components such as connectors to the electric wires, and performs other operations to assemble a wire harness. The assembly drawing plate is provided with a plurality of supports for supporting the electric wires and the connectors, and the wire harness is supported by the plurality of supports, and is held at predetermined positions on the assembly drawing plate.

SUMMARY

Meanwhile, in recent years, there are a large variety of types of wire harnesses due to an increase in the number of in-car devices that are installed in vehicles, or the like. Accordingly, in order to efficiently perform assembly of wire harnesses of different types, that is, wire harnesses having different product numbers, a method has been proposed in which, for example, a step of assembling a first wire harness, which may be a part that is used in common among (that is the same for) a variety of types of wire harnesses, and a step of assembling a second wire harness that is attached in accordance with its product number to the first wire harness are performed separately, and the suitably selected second wire harness is attached to the first wire harness to finish the assembly. However, such a method will need an assembly drawing plate to attach the second wire harness to a predetermined position on the first wire harness. Therefore, in the finishing step, the first wire harness needs to be positioned while being supported by a plurality of supports of the assembly drawing plate, and thus work efficiency is considered to be poor in this respect.

The present design was made in view of the above-described circumstances, and it is an object thereof to provide a wire harness that enable an efficient assembly operation.

According to the present design, a wire harness includes: a first wire harness to which a clamp is fixed at a predetermined position; and a second wire harness that is provided with a fitting portion into which the clamp can be fitted, wherein the fitting portion is formed in a plate member that is overall flat-plate shaped, the plate member being provided with a passage hole for a banding band that penetrates the plate member in a thickness direction of the plate member, the second wire harness is attached to the first wire harness by fitting the clamp into the fitting portion, and the clamp serves as fixation means for fixing the wire harness to a vehicle body or the like, and as attaching means for attaching the second wire harness to the first wire harness.

According to the present design, a wire harness includes: a first wire harness to which a clamp is fixed at a predetermined position; and a second wire harness that is provided with a fitting portion into which the clamp can be fitted, wherein the fitting portion is formed by bending electric wires that constitute the second wire harness into a circle, and the second wire harness is attached to the first wire harness by fitting the clamp into the fitting portion.

According to the present design, a wire harness manufacturing method by attaching a second wire harness to a first wire harness includes: a first assembling step of assembling the first wire harness, and fixing a clamp to a predetermined position on the first wire harness; a second assembling step of assembling the second wire harness, and providing a fitting portion into which the clamp can be fitted; and a finishing step of attaching the second wire harness to the first wire harness by fitting the clamp into the fitting portion.

According to the present design, the second wire harness can be attached to a predetermined position on the first wire harness, by fitting the clamp into the fitting portion, and thus an operation of attaching the second wire harness is possible without using an assembly drawing plate, thus making it possible to efficiently perform a wire harness assembly operation.

BRIEF DESCRIPTION OF DRAWINGS

FIG. 9 is a side view illustrating a clamp according to Embodiment 5 in a state before it is fixed to a first wire harness.

DESCRIPTION OF EMBODIMENTS

Hereinafter, preferred embodiments will be described.

In the wire harness of the present design, the fitting portion may be formed in a plate member, the plate member may be fixed to electric wires that constitute the second wire harness, and the second wire harness may be attached to the first wire harness so that the first wire harness and the second wire harness are arranged on a front or a rear surface of the plate member.

According to such a configuration, as a result of the wire harnesses being attached with the other one of the surfaces of the plate member facing a vehicle body or the like, the plate member is arranged between the wire harnesses and the vehicle body or the like, and thus it is possible to protect the wire harnesses from coming into contact with the vehicle body or the like.

Furthermore, in the wire harness of the present design, the fitting portion may be formed by bending electric wires that constitute the second wire harness into a circle.

According to such a configuration, no other component is needed for providing the fitting portion, and thus it is possible to prevent an increase in the number of components.

Furthermore, in the wire harness of the present design, the clamp may include a pressing portion that protrudes in a direction that intersects a direction in which the clamp is fitted into the fitting portion, and presses against the fitting portion.

According to such a configuration, it is possible to reliably fix the second wire harness to the first wire harness.

Embodiment 1

Figure 1:
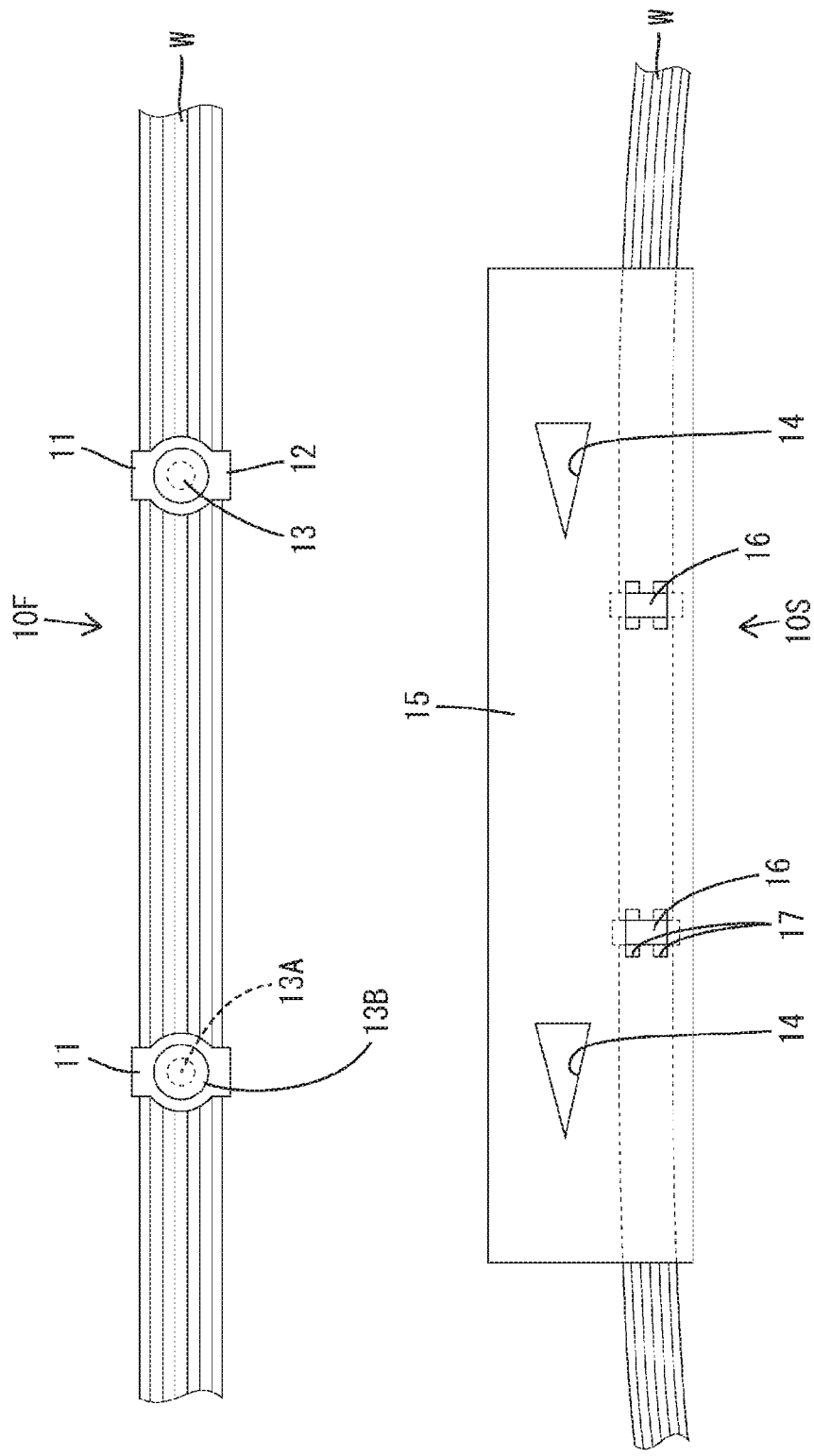
FIG. 1 is a plan view of a wire harness according to Embodiment 1, illustrating a state before a second wire harness is attached to a first wire harness.
Figure 2:
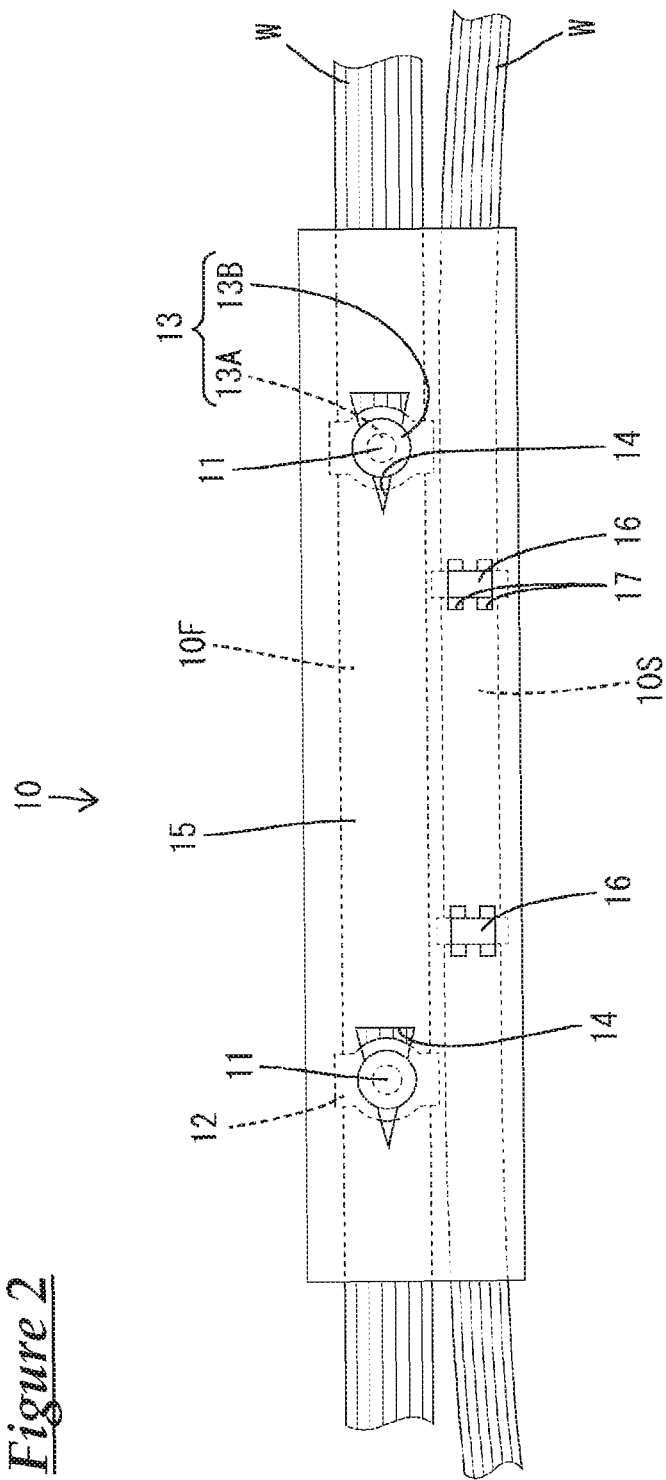
FIG. 2 is a plan view of the wire harness, illustrating a state in which the second wire harness is attached to the first wire harness.

The following will describe one embodiment into which the present design is embodied in detail with reference to FIGS. 1 and 2.

A wire harness 10 of the present embodiment is arranged in a vehicle or the like, and is manufactured by adding a second wire harness 10S in accordance with a product number to a first wire harness 10F serving as a base part, which may be a part that is used in common among (that is the same for) a variety of types of wire harnesses 10.

As shown in FIG. 1, clamps 11 are fixed to predetermined positions on the first wire harness 10F. A pair of clamps 11 are provided at locations of the first wire harness 10F to which the second wire harness 10S is to be attached.

The clamps 11 are made of a synthetic resin, and are each provided with a band portion 12 for bundling together a plurality of electric wires W that constitute the first wire harness 10F, and an engaging portion 13 that is configured to be inserted into a mounting hole H (see FIG. 10) formed in a vehicle body or the like, and to engage with the circumferential edge of the mounting hole H from the rear thereof so as to keep the clamp from dislodging. The engaging portion 13 includes a shaft portion 13A that extends in a direction in which it is inserted into the mounting hole H, and a protruding portion 13B that protrudes outward from the front end of the shaft portion 13A. The shaft portion 13A is columnar, and the protruding portion 13B protrudes in a circular shape that is slightly larger than the shaft portion 13A.

The second wire harness 10S is provided with fitting portions 14 into which the clamps 11 can be fitted.

The fitting portions 14 are provided in a plate member 15 that is made of a cardboard material or the like. The plate member 15 is elongated and substantially rectangular extending in a direction in which the electric wires W extend.

A pair of fitting portions 14 are provided at an interval that is equal to the interval at which the pair of clamps 11 are fixed to the first wire harness 10F. The pair of fitting portions 14 are positioned closer to the two ends, in a longitudinal direction, of the plate member 15, and are aligned with respect to its width direction.

The fitting portions 14 are triangular through holes whose entire periphery is closed, and that penetrate the plate member 15 in its front-rear direction. The fitting portions 14 each have the shape of an isosceles triangle that is elongated in the direction in which the electric wires W extend, and are formed such that their tips point in the same direction. The width (dimension in the width direction) of the fitting portions 14 is smaller than the width of the protruding portions 13B of the clamps 11.

The plate member 15 is fixed to electric wires W that constitute the second wire harness 10S. The plate member 15 is fixed using banding bands 16 that are made of a synthetic resin, and bundle together the electric wires W constituting the second wire harness 10S. The banding bands 16 are passed through two passage holes 17 formed in the plate member 15 to the front surface side of the plate member 15, and fastened, bundling the electric wires W together on the rear surface side of the plate member 15. The plate member 15 is fixed to the electric wires W in two positions. Note that the fixation positions at which the plate member 15 is fixed to the electric wires W, or the number of the fixation positions may be changed as appropriate.

The following will describe an example of a method for manufacturing the wire harness 10 by attaching the second wire harness 10S to the first wire harness 10F.

First, a first assembling step of assembling the first wire harness 10F is performed. Based on an assembly drawing on an assembly drawing plate, an assembly operator lays out the electric wires W, bands the laid out electric wires W into a bundle, connects electric components such as connectors to the electric wires W, and fixes the clamps 11 to predetermined positions. Thus, the first wire harness 10F to which the clamps 11 are fixed at the predetermined positions is assembled.

Then, a second assembling step of assembling the second wire harness 10S is performed. Based on the assembly drawing on the assembly drawing plate, the assembly operator lays out the electric wires W, bands the laid out electric wires W into bundles, connects electric components such as connectors to the electric wires W, and fixes the plate member 15 provided with the fitting portions 14 to the electric wires W using the banding bands 16 for banding the bundle of the electric wires W. Thus, the second wire harness 10S provided with the fitting portions 14 is assembled.

Then, the first wire harness 10F and the second wire harness 10S that have been assembled in the first assembling step and the second assembling step are transferred to a predetermined work area in which a finishing step is to be performed.

Then, the finishing step of attaching the second wire harness 10S to the first wire harness 10F to finish the wire harness 10 is performed. The plate member 15 is arranged so that the pair of fitting portions 14 are located above the pair of clamps 11 with the rear surface (surface to which the second wire harness 10S is fixed) of the plate member 15 facing the first wire harness 10F. At this time, the engaging portions 13 of the clamps 11 should be located on a large width side (right side of FIG. 1) of the fitting portions 14. Then, the plate member 15 is pushed to cause the clamps 11 to be fitted into the fitting portions 14. Accordingly, the engaging portions 13 protrude from the front surface of the plate member 15 through the fitting portions 14, and the protruding portions 13B engage with the front surface of the plate member 15 (see FIG. 2). Then, the plate member 15 is shifted in the longitudinal direction thereof so that the shaft portions 13A of the clamps 11 approach a small width side (tip side) of the fitting portions 14. Accordingly, the second wire harness 10S is attached to predetermined positions on the first wire harness 10F, and the operation of manufacturing the wire harnesses 10 is complete. The complete wire harness 10 is fixed to the rear surface of the plate member 15.

The following will describe functions and effects of the above-described configuration of the present embodiment.

The wire harness 10 of the present embodiment includes: the first wire harness 10F to which the clamps 11 are fixed at predetermined positions; and the second wire harness 10S that is provided with the fitting portions 14 into which the clamps 11 can be fitted, and the second wire harness 10S is attached to the first wire harness 10F by fitting the clamps 11 into the fitting portions 14. According to this configuration, by fitting the clamps 11 into the fitting portions 14, the second wire harness 10S can be attached to the predetermined positions on the first wire harness 10F, and thus an operation of attaching the second wire harness 10S is possible without using an assembly drawing plate, thus making it possible to efficiently perform the operation of assembling the wire harness 10.

Furthermore, the fitting portions 14 are formed in the plate member 15, the plate member 15 is fixed to the electric wires W constituting the second wire harness 10S, and the second wire harness 10S is attached to the first wire harness 10F so that the first wire harness 10F and the second wire harness 10S are arranged on the rear surface of the plate member 15. According to this configuration, as a result of the wire harness 10 being attached with the front surface of the plate member 15 facing the vehicle body or the like, the plate member 15 is arranged between the wire harness 10 and the vehicle body or the like, and thus it is possible to prevent the wire harness 10 from coming into contact with the vehicle body or the like.

Embodiment 2

Figure 3:
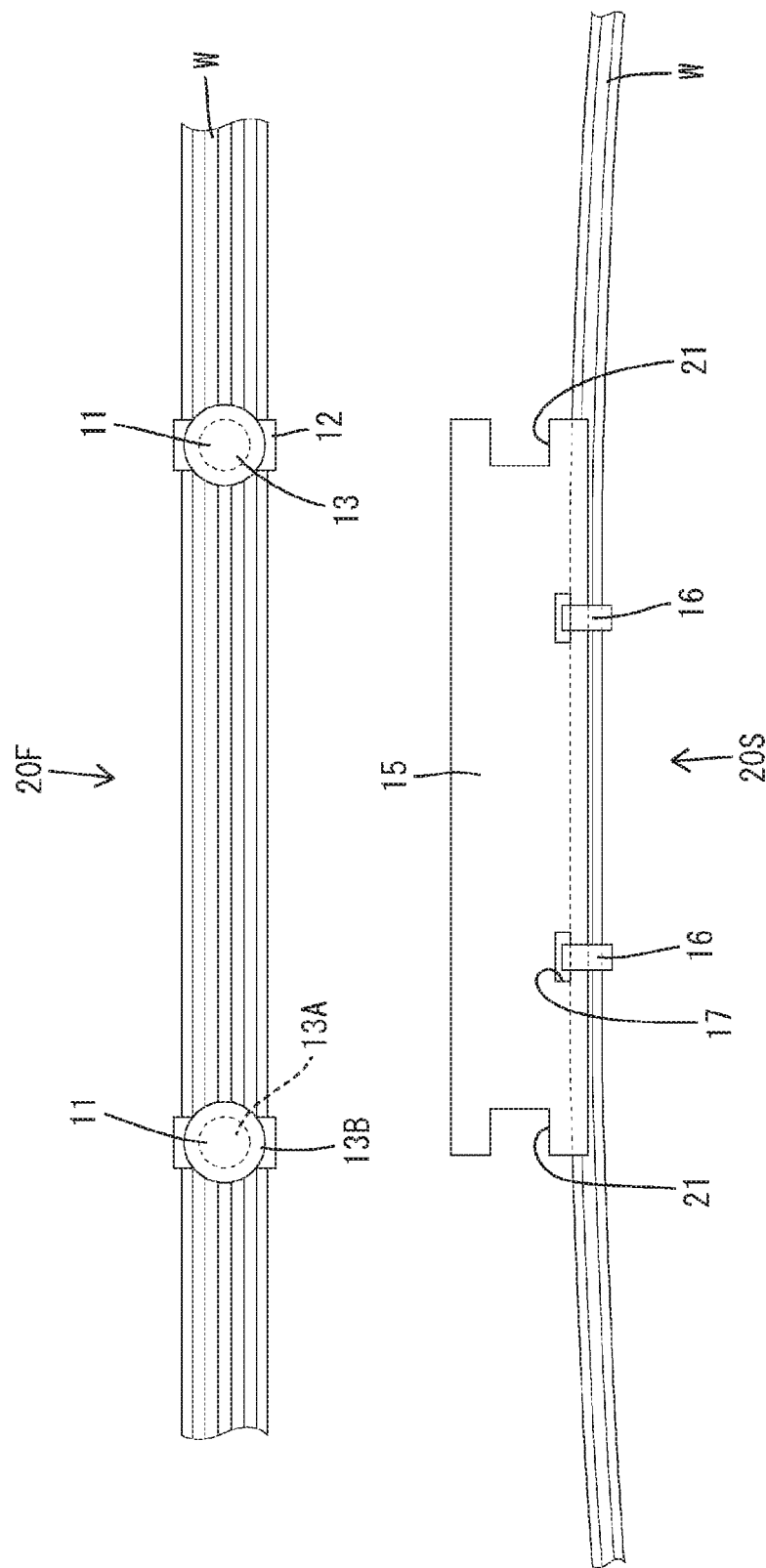
FIG. 3 is a plan view of a wire harness according to Embodiment 2, illustrating a state before a second wire harness is attached to a first wire harness.
Figure 4:
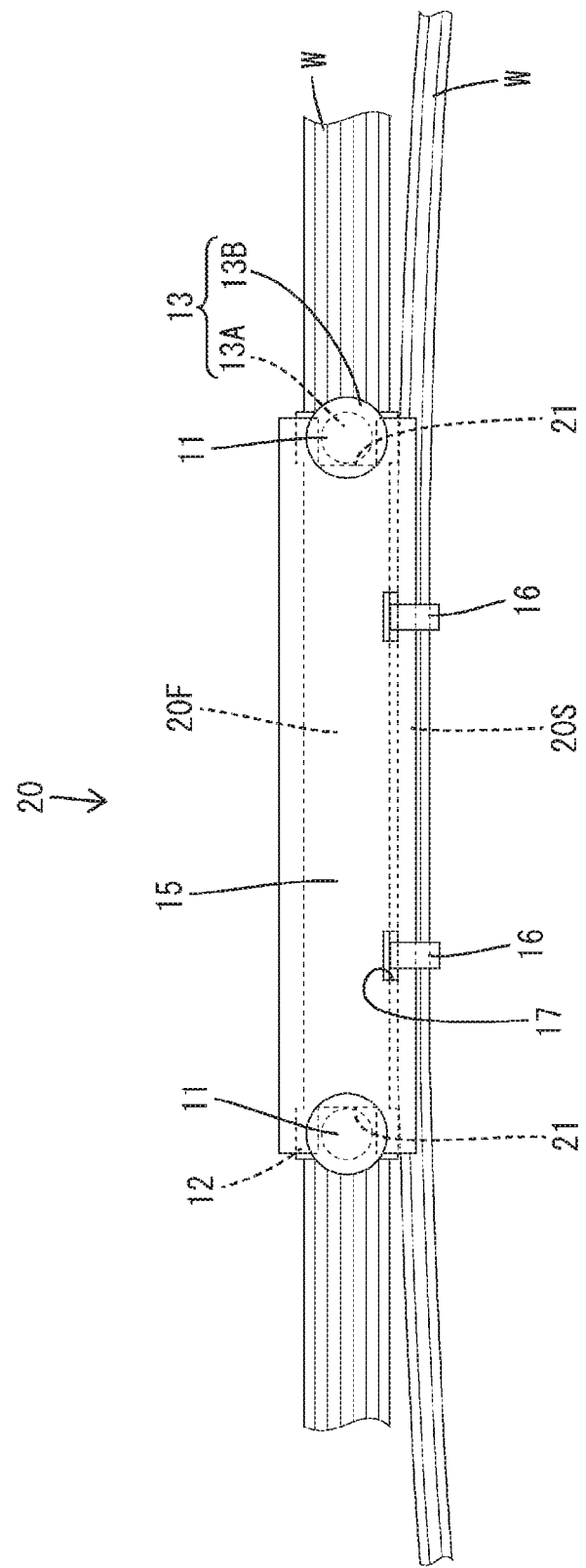
FIG. 4 is a plan view of the wire harness, illustrating a state in which the second wire harness is attached to the first wire harness.

The following will describe a wire harness 20 according to Embodiment 2 into which the present design is embodied with reference to FIGS. 3 and 4.

The wire harness 20 of the present embodiment differs from Embodiment 1 in that fitting portions 21 are open to the side. Note that the same reference signs are given to the same structures as in Embodiment 1, and redundant descriptions are omitted.

As in Embodiment 1, the wire harness 20 according to the present embodiment includes a first wire harness 20F to which clamps 11 are fixed to predetermined positions, and a second wire harness 20S that is provided with fitting portions 21 into which the clamps 11 can be fitted, and the second wire harness 20S is attached to the first wire harness 20F by fitting the clamps 11 into the fitting portions 21.

Furthermore, as in Embodiment 1, in the wire harness 20 according to the present embodiment, the fitting portions 21 are formed in a plate member 15, the plate member 15 is fixed to electric wires W that constitute the second wire harness 20S, and the second wire harness 20S is attached to the first wire harness 20F so that the first wire harness 20F and the second wire harness 20S are arranged on the front or the rear surface of the plate member 15.

As in Embodiment 1, the first wire harness 20F is provided with a pair of clamps 11 at locations to which the second wire harness 20S is to be attached, and the second wire harness 20S is provided with a pair of fitting portions 21 into which the clamps 11 can be fitted.

The pair of fitting portions 21 are provided at both ends, in the longitudinal direction, of the plate member 15, and the fitting portions 21 are substantially square cut-out portions that penetrate the plate member 15 in the front-rear direction, and are open to the side. The width of the fitting portions 21 (dimension of the open end) is set to be equal to the width of the shaft portions 13A of the clamps 11.

As in Embodiment 1, the plate member 15 is fixed to the electric wires W constituting the second wire harness 20S using the banding bands 16. The banding bands 16 are passed through one passage hole 17 formed in the plate member 15 to the front surface side of the plate member 15, and fastened, bundling the electric wires W together on the rear surface side of the plate member 15.

Then, as in Embodiment 1, the wire harness 20 is manufactured through: a first assembling step of assembling the first wire harness 20F, and fixing the clamps 11 to predetermined positions on the first wire harness 20F; a second assembling step of assembling the second wire harness 20S, and providing the fitting portions 21 into which the clamps 11 can be fitted; and a finishing step of attaching the second wire harness 20S to the first wire harness 20F by fitting the clamps 11 into the fitting portions 21.

As in Embodiment 1, in the finishing step, the plate member 15 is arranged so that the pair of fitting portions 21 are located above the pair of clamps 11 with the rear surface (surface to which the second wire harness 20S is fixed) of the plate member 15 facing the first wire harness 20F. Then, when the shaft portions 13A of the clamps 11 are fitted into the fitting portions 21 laterally, the protruding portions 13B engage with the front surface of the plate member 15, and the second wire harness 20S is attached to the predetermined positions on the first wire harness 20F. Accordingly, the operation of manufacturing the wire harness 20 is complete. As in Embodiment 1, the complete wire harness 20 is fixed to the rear surface of the plate member 15.

As described above, in the present embodiment, since the wire harness 20 includes: the first wire harness 20F to which the clamps 11 are fixed at predetermined positions; and the second wire harness 20S that is provided with the fitting portions 21 into which the clamps 11 can be fitted, and the second wire harness 20S is attached to the first wire harness 20F by fitting the clamps 11 into the fitting portion 21, it is possible, as in Embodiment 1, to attach the second wire harness 20S to the predetermined positions on the first wire harness 20F by fitting the clamps 11 into the fitting portions 21, making it possible to perform an efficient operation of assembling the wire harness 20.

Furthermore, since the fitting portions 21 are open to the side, it is possible to easily perform an operation of fitting the clamps 11.

Embodiment 3

Figure 5:
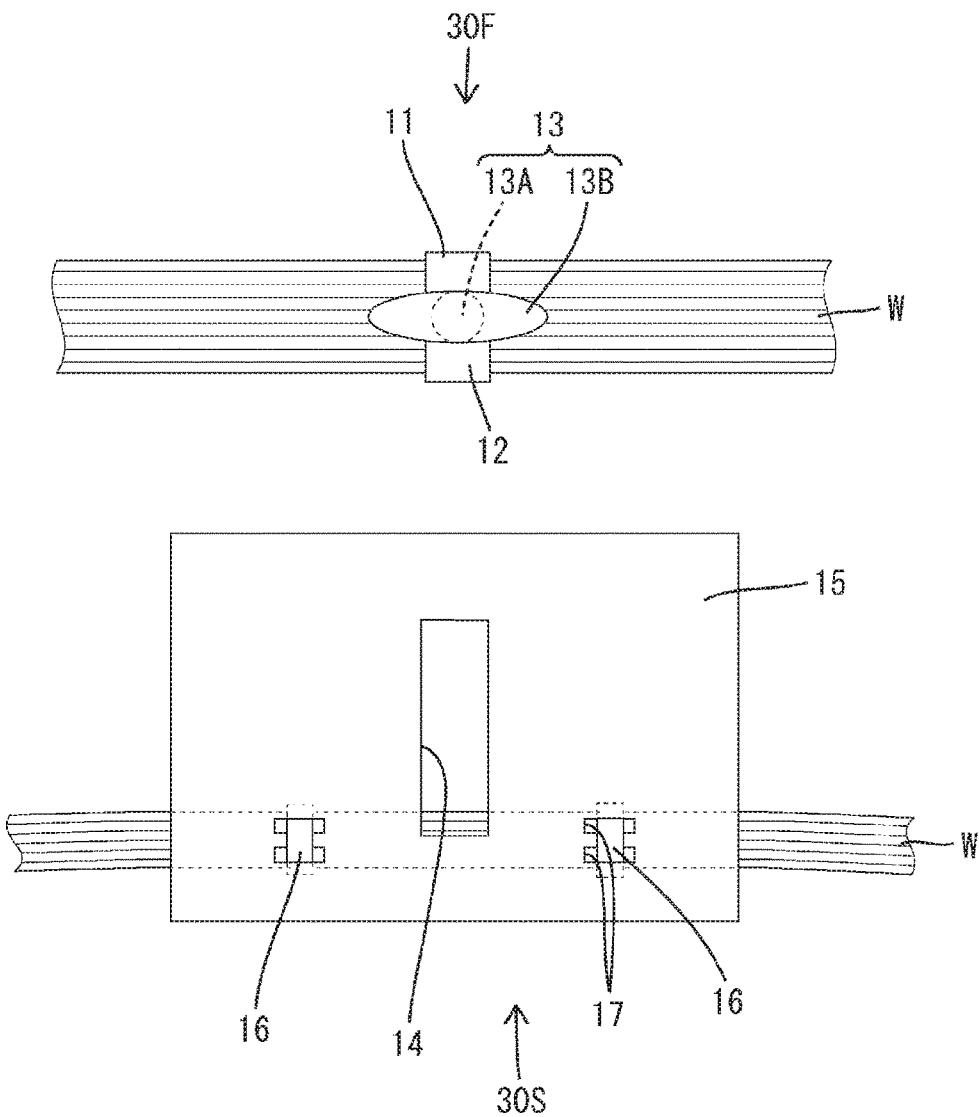
FIG. 5 is a plan view of a wire harness according to Embodiment 3, illustrating a state before a second wire harness is attached to a first wire harness.
Figure 6:
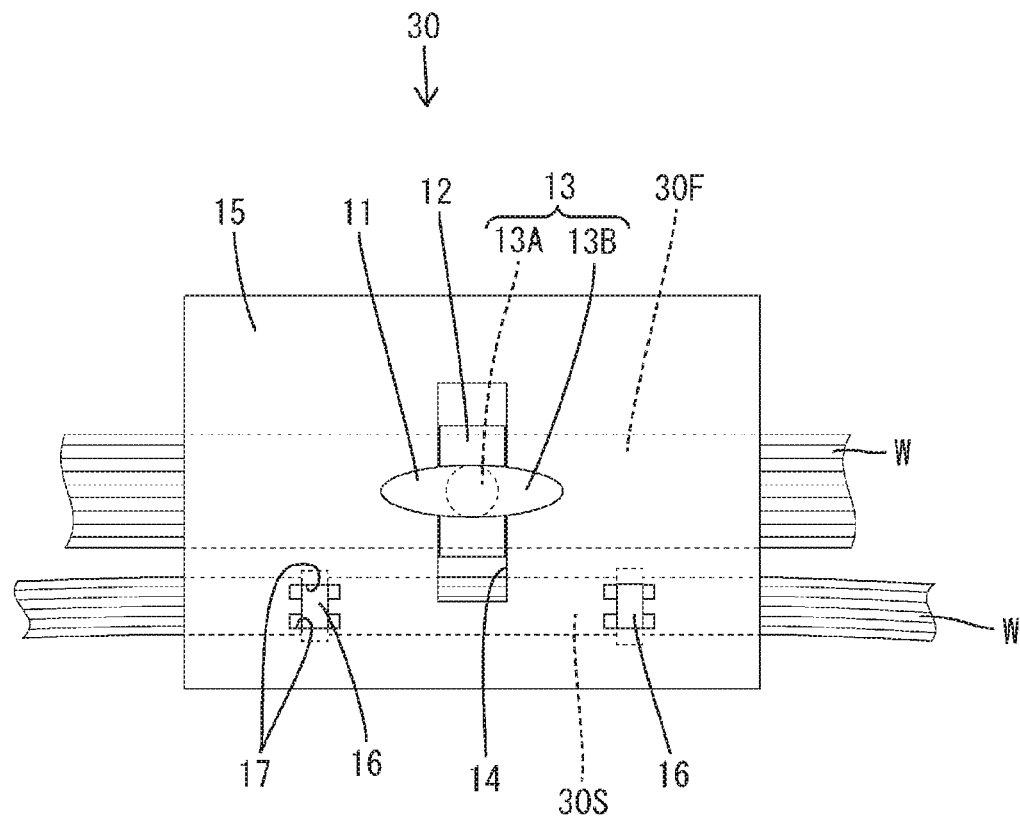
FIG. 6 is a plan view of the wire harness, illustrating a state in which the second wire harness is attached to the first wire harness.

The following will describe a wire harness 30 according to Embodiment 3 into which the present design is embodied with reference to FIGS. 5 and 6.

The wire harness 30 of the present embodiment differs from Embodiment 1 in that only one clip is fixed to a first wire harness 30F, and only one fitting portion 14 is provided in a second wire harness 30S. Note that the same reference signs are given to the same structures as those of Embodiment 1, and redundant descriptions are omitted.

As in Embodiment 1, the wire harness 30 according to the present embodiment includes: a first wire harness 30F to which a clamp 11 is fixed at a predetermined position; and a second wire harness 30S that is provided with a fitting portion 14 into which the clamp 11 can be fitted, and the second wire harness 30S is attached to the first wire harness 30F by fitting the clamp 11 into the fitting portion 14.

Furthermore, as in Embodiment 1, in the wire harness 30 according to the present embodiment, the fitting portion 14 is formed in a plate member 15, the plate member 15 is fixed to electric wires W that constitute the second wire harness 30S, and the second wire harness 30S is attached to the first wire harness 30F so that the first wire harness 30F and the second wire harness 30S are arranged on the front or the rear surface of the plate member 15.

The first wire harness 30F is provided with only one clamp 11 at a location to which the second wire harness 30S is to be attached, and the second wire harness 30S is provided with only one fitting portion 14 into which the clamp 11 can be fitted.

As in Embodiment 1, the clamp 11 is provided with a band portion 12 for bundling together a plurality of electric wires W that constitute the first wire harness 30F, and an engaging portion 13 that is configured to be inserted into a mounting hole H (see FIG. 10) formed in a vehicle body or the like, and to engage with the circumferential edge of the mounting hole H from the rear thereof so as to keep the clamp from dislodging. The engaging portion 13 includes a shaft portion 13A that extends in a direction in which it is inserted into the mounting hole H, and a protruding portion 13B that protrudes outward from the front end of the shaft portion 13A. The shaft portion 13A is columnar, and the protruding portion 13B protrudes from the front end of the shaft portion 13A in both backward and forward directions (the two directions along the electric wires W) by the same amount. When seen in the plan view, the protruding portion 13B has a shape elongated in the backward and forward directions.

The fitting portion 14 is provided substantially in the central part, in the longitudinal direction, of the plate member 15. The fitting portion 14 is a through hole that is elongated rectangular extending in the width direction of the plate member 15 (direction that is substantially orthogonal to the electric wires W), and penetrates the plate member 15 in its front-rear direction. The fitting portion 14 is so large that the protruding portion 13B of the clamp 11 can be passed therethrough.

As in Embodiment 1, the plate member 15 is fixed to the electric wires W constituting the second wire harness 30S using the banding bands 16.

As in Embodiment 1, the wire harness 30 is manufactured through: a first assembling step of assembling the first wire harness 30F, and fixing the clamp 11 to a predetermined position on the first wire harness 30F; a second assembling step of assembling the second wire harness 30S, and providing the fitting portion 14 into which the clamp 11 can be fitted; and a finishing step of attaching the second wire harness 30S to the first wire harness 30F by fitting the clamp 11 into the fitting portion 14.

As in Embodiment 1, in the finishing step, the plate member 15 is arranged so that the one fitting portion 14 is located above the one clamp 11 with the rear surface (surface to which the second wire harness 30S is fixed) of the plate member 15 facing the first wire harness 30F. Then, the plate member 15 (second wire harness 30S) is turned so that the fitting portion 14 is aligned with the protruding portion 13B of the clamp 11, that is, the longitudinal direction of the fitting portion 14 and the longitudinal direction of the protruding portion 13B match each other, and the clamp 11 is fitted into the fitting portion 14. Accordingly, the protruding portion 13B protrudes from the front surface of the plate member 15 through the fitting portion 14. Then, the plate member 15 (second wire harness 30S) is turned, so that the protruding portion 13B is engaged with the two sides, in the width direction, of the fitting portion 14, as shown in FIG. 6. Accordingly, the second wire harness 30S is attached to the predetermined position on the first wire harness 30F, and the operation of manufacturing the wire harness 30 is complete. As in Embodiment 1, the complete wire harness 30 is fixed to the rear surface of the plate member 15.

As described above, in the present embodiment, since the wire harness 30 includes: the first wire harness 30F to which the clamp 11 is fixed at a predetermined position; and the second wire harness 30S that is provided with the fitting portion 14 into which the clamp 11 can be fitted, and the second wire harness 30S is attached to the first wire harness 30F by fitting the clamp 11 into the fitting portion 14, it is possible, as in Embodiment 1, to attach the second wire harness 30S to a predetermined position on the first wire harness 30F by fitting the clamp 11 into the fitting portion 14, making it possible to perform an efficient operation of assembling the wire harness 30.

Embodiment 4

Figure 7:
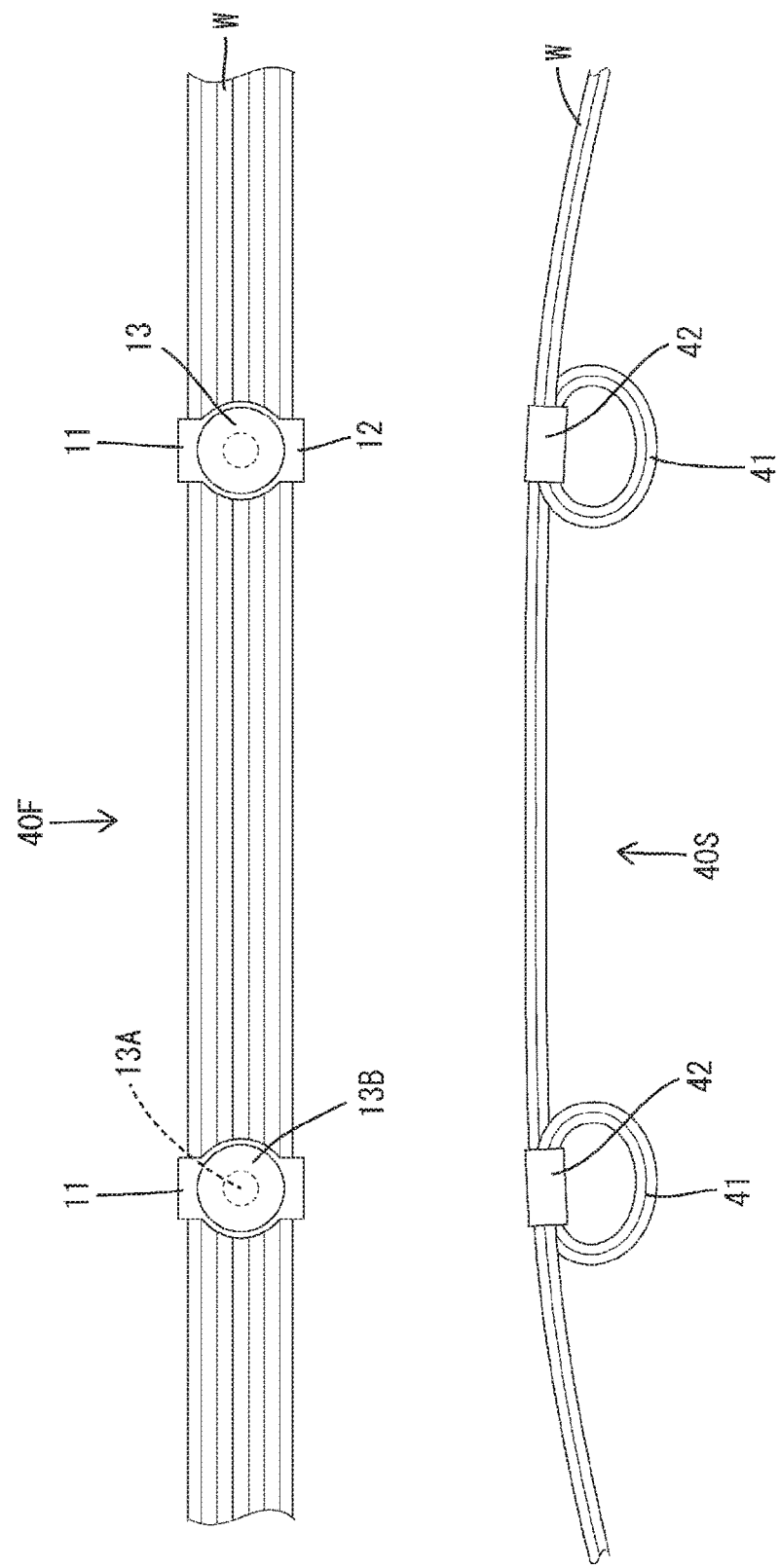
FIG. 7 is a plan view of a wire harness according to Embodiment 4, illustrating a state before a second wire harness is attached to a first wire harness.
Figure 8:
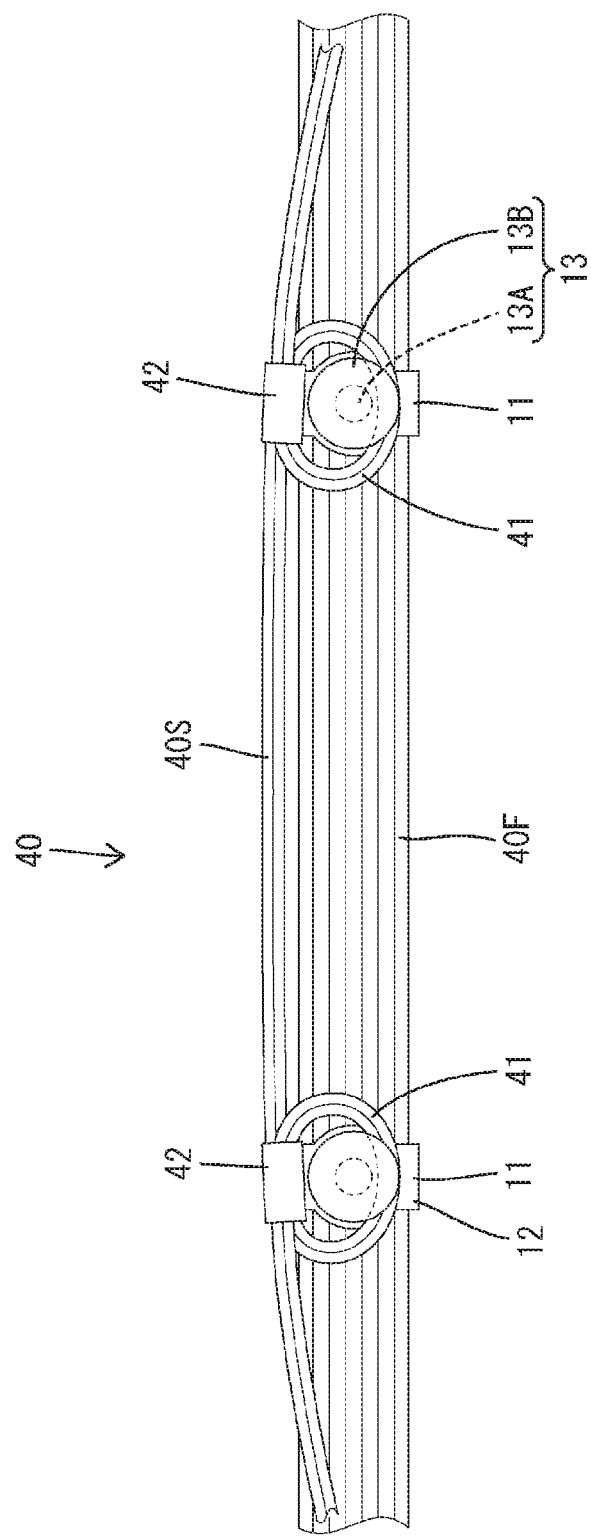
FIG. 8 is a plan view of the wire harness, illustrating a state in which the second wire harness is attached to the first wire harness.

The following will describe a wire harness 40 according to Embodiment 4 into which the present design is embodied with reference to FIGS. 7 and 8.

The wire harness 40 of the present embodiment differs from Embodiment 1 in that fitting portions 41 are each formed by bending electric wires W that constitute a second wire harness 40S into a circle. Note that the same reference signs are given to the same structures as those of Embodiment 1, and redundant descriptions are omitted.

As in Embodiment 1, the wire harness 40 according to the present embodiment includes a first wire harness 40F to which clamps 11 are fixed to predetermined positions, and the second wire harness 40S that is provided with fitting portions 41 into which the clamps 11 can be fitted, and the second wire harness 40S is attached to the first wire harness 40F by fitting the clamps 11 into the fitting portions 41.

As in Embodiment 1, the first wire harness 40F is provided with a pair of clamps 11 at locations to which the second wire harness 40S is to be attached, and the second wire harness 40S is provided with a pair of fitting portions 41 into which the clamps 11 can be fitted.

The pair of fitting portions 41 are each formed by bending the electric wires W constituting the second wire harness 40S into a circle. In a second assembling step of assembling the second wire harness 40S, the fitting portions 41 are each formed by bending a predetermined area of the electric wires W into a circle, and winding a tape 42 around the electric wires W.

Then, as in Embodiment 1, the wire harness 40 is manufactured through: a first assembling step of assembling the first wire harness 40F, and fixing the clamps 11 to predetermined positions on the first wire harness 40F; a second assembling step of assembling the second wire harness 40S, and providing the fitting portions 41 into which the clamps 11 can be fitted; and a finishing step of attaching the second wire harness 40S to the first wire harness 40F by fitting the clamps 11 into the fitting portions 41.

In the finishing step, as shown in FIG. 8, the clamps 11 are fitted into the fitting portions 41, so that the protruding portions 13B of the clamps 11 are engaged with the front sides of the fitting portions 41. Accordingly, the second wire harness 40S is attached to the predetermined positions on the first wire harness 40F, and the operation of manufacturing the wire harness 40 is complete.

As described above, in the present embodiment, since the wire harness 40 includes: the first wire harness 40F to which the clamps 11 are fixed at predetermined positions; and the second wire harness 40S that is provided with the fitting portions 41 into which the clamps 11 can be fitted, and the second wire harness 40S is attached to the first wire harness 40F by fitting the clamps 11 into the fitting portions 41, it is possible, as in Embodiment 1, to attach the second wire harness 40S to the predetermined positions on the first wire harness 40F by fitting the clamps 11 into the fitting portion 41, making it possible to perform an efficient operation of assembling the wire harness 40.

Furthermore, since the fitting portions 41 are formed by bending the electric wires W constituting the second wire harness 40S into circles, no other component such as the plate member 15 is needed for providing the fitting portions 41, and thus it is possible to prevent an increase in the number of components.

Embodiment 5

Figure 10:
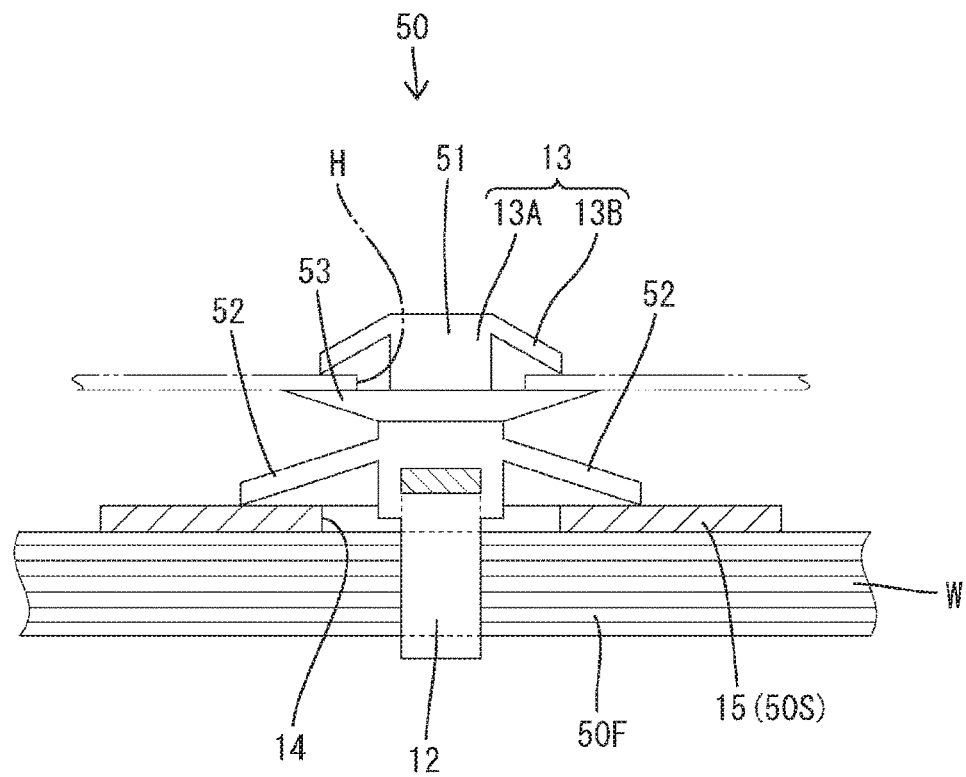
FIG. 10 is a side cross-sectional view illustrating a state in which the wire harness is attached to a vehicle or the like using the clamp.

The following will describe a wire harness 50 according to Embodiment 5 into which the present design is embodied with reference to FIGS. 9 and 10.

The wire harness 50 of the present embodiment differs from Embodiment 1 in that a clamp 51 has pressing portions 52 that protrude in directions that intersect the direction in which the clamp 51 is fitted into a fitting portion 14, and press against the fitting portion 14. Note that the same reference signs are given to the same structures as those of Embodiment 1, and redundant descriptions are omitted.

As in Embodiment 1, the wire harness 50 according to the present embodiment includes: a first wire harness 50F to which the clamp 51 is fixed at a predetermined position; and a second wire harness 50S that is provided with a fitting portion 14 into which the clamp 51 can be fitted, and the second wire harness 50S is attached to the first wire harness 50F by fitting the clamp 51 into the fitting portion 14.

Furthermore, as in Embodiment 1, in the wire harness 50 according to the present embodiment, the fitting portion 14 is formed in a plate member 15, the plate member 15 is fixed to electric wires W that constitute the second wire harness 50S, and the second wire harness 50S is attached to the first wire harness 50F so that the first wire harness 50F and the second wire harness 50S are arranged on the front or the rear surface of the plate member 15.

As in Embodiment 1, the clamp 51 is provided with a band portion 12 for bundling together a plurality of electric wires W that constitute the first wire harness 50F, and an engaging portion 13 that is configured to be inserted into a mounting hole H formed in a vehicle body or the like, and to engage with the circumferential edge of the mounting hole H from the rear thereof so as to keep the clamp from dislodging. The engaging portion 13 includes a shaft portion 13A that extends in a direction in which it is inserted into the mounting hole H, and a protruding portion 13B that protrudes outward from the front end of the shaft portion 13A.

Furthermore, the clamp 51 is provided with a receiving portion 53 that abuts against a mounting area of the vehicle body or the like from the side opposite to the protruding portion 13B. The receiving portion 53 protrudes outward the shaft portion 13A in the shape of a disc.

The clamp 51 is also provided with the pressing portions 52 that protrude outward from the shaft portion 13A (in directions that intersect the direction in which the clamp 51 is fitted into the fitting portion 14), and press against the fitting portion 14. A pair of pressing portions 52 are provided so as to protrude backward and forward from the shaft portion 13A. The pair of pressing portions 52 are provided below the receiving portion 53 (on the side opposite to the protruding portion 13B). The pressing portions 52 are inclined so as to descend as moving outward away from the shaft portion 13A (to be located on the rear side in the direction in which the clamp 51 is fitted into the fitting portion 14).

As in Embodiment 1, the wire harness 50 is manufactured through: a first assembling step of assembling the first wire harness 50F, and fixing the clamp 51 to a predetermined position on the first wire harness 50F; a second assembling step of assembling the second wire harness 50S, and providing the fitting portion 14 into which the clamp 51 can be fitted; and a finishing step of attaching the second wire harness 50S to the first wire harness 50F by fitting the clamp 51 into the fitting portion 14.

In the finishing step, as shown in FIG. 10, when the clamp 51 is fitted into the fitting portion 14, the pressing portions 52 are engaged with the front side of the fitting portion 14. At this time, if the fitting portion 14 is formed in the plate member 15, the ends (lower ends) of the pressing portions 52 come into contact with the front surface of the plate member 15 that is arranged along the front side of the first wire harness 50F (while being in intimate contact therewith). Accordingly, the second wire harness 50S is attached to the predetermined position on the first wire harness 50F, and the operation of manufacturing the wire harness 50 is complete.

As described above, in the present embodiment, since the wire harness 50 includes: the first wire harness 50F to which the clamp 51 is fixed at a predetermined position; and the second wire harness 50S that is provided with the fitting portion 14 into which the clamp 51 can be fitted, and the second wire harness 50S is attached to the first wire harness 50F by fitting the clamp 51 into the fitting portion 14, it is possible, as in Embodiment 1, to attach the second wire harness 50S to the predetermined position on the first wire harness 50F by fitting the clamp 51 into the fitting portion 14, making it possible to perform an efficient operation of assembling the wire harness 50.

Furthermore, since the clamp 51 includes the pressing portions 52 that protrude in directions that intersect the direction in which the clamp 51 is fitted into the fitting portion 14, and press against the fitting portion 14, it is possible to reliably fix the second wire harness 50S to the first wire harness 50F.

Other Embodiments

The present invention is not limited to the embodiments explained with reference to the foregoing description and the drawings, and the technical scope of the present application encompasses, for example, the following embodiments as well.

In the foregoing embodiments, the fitting portion 14 (21) is formed in the plate member 15, but the present invention is not limited to this, and a configuration is also possible in which a fitting portion is formed in, for example, a banding band for bundling the second harness or the like, and the banding band is fixed to a predetermined position.

In the foregoing embodiments, the plate member 15 is fixed to the electric wires W constituting the second wire harness 10S using the banding band 16, but the fixation means is not limited to this, and the plate member and the electric wires may be fixed to each other with, for example, a tape or the like.

In the foregoing embodiments, the plate member 15 is made of a cardboard material or the like, but the present invention is not limited to this, and the plate member 15 may be made of, for example, plastic or the like that is relatively lightweight and is easy to be handled.

In the foregoing embodiments, the clamp 11 (51) is also used as fixation means when the wire harness 10 (20) (30) (40) (50) is fixed to a vehicle body or the like, but the present invention is not limited to this, and the clamp may be used only as attaching means for attaching the second wire harness.

In Embodiment 1 above, the fitting portions 14 have the shape of an isosceles triangle elongated in the direction in which the electric wires W extend, but the present invention is not limited to this, and the fitting portions may have any shape as long as the clamps can be fitted thereinto. For example, the fitting portions may have any shape such as a circular shape or a rectangular shape.

In Embodiment 2 above, the fitting portions 21 are substantially rectangular, but the present invention is not limited to this, and the fitting portions may have any shape as long as the shaft portions of the clamps can be fitted laterally thereinto and the protruding portions of the clamps can engage therewith. For example, the fitting portions may have an arc-like shape along the outer circumferential surface of the shaft portion of the corresponding clamp.

In Embodiment 3 above, the protruding portion 13B protrudes from the shaft portion 13A in the direction along the electric wires W and the fitting portion 14 is elongated in the direction that is substantially orthogonal to the electric wires W, but the present invention is not limited to this, and the protruding portion and the fitting portion may have any shape as long as the protruding portion is engaged with the fitting portion by turning the plate member after the protruding portion is inserted into the fitting portion. For example, the protruding portion may protrude from the shaft portion in the direction substantially orthogonal to the electric wires, and the fitting portion may be elongated in the direction along the electric wires.

In Embodiment 4 above, the fitting portion 41 is formed by bending all the electric wires W constituting the second wire harness 40S into a circle, but the present invention is not limited to this, and the fitting portion may be formed by bending, for example, only selected at least one of all the electric wires constituting the second wire harness.

In Embodiment 5 above, a pair of pressing portions 52 are provided protruding backward and forward, but the present invention is not limited to this, and the pressing portions may have any shape as long as it can press against the fitting portion, and the number of the pressing portions, the direction in which they protrude, and the like may suitably be changed.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

REFERENCE SIGNS LIST

W . . . Electric wire
10, 20, 30, 40, 50 . . . Wire harness
10F, 20F, 30F, 40F, 50F . . . First wire harness
10S, 20S, 30S, 40S, 50S . . . Second wire harness
11, 51 . . . Clamp
14, 21, 41 . . . Fitting portion
15 . . . Plate member
52 . . . Pressing portion

The invention claimed is:

1. A wire harness comprising:
a first wire harness to which a clamp is fixed at a predetermined position; and
a second wire harness that is provided with a fitting portion into which the clamp can be fitted,
wherein the fitting portion is formed in a plate member that is overall flat-plate shaped, the plate member being provided with a passage hole for a banding band that penetrates the plate member in a thickness direction of the plate member,
the second wire harness is attached to the first wire harness by fitting the clamp into the fitting portion, and
the clamp serves as fixation means for fixing the wire harness to a vehicle body or the like, and as attaching means for attaching the second wire harness to the first wire harness.

2. The wire harness according to claim 1,
wherein the plate member is fixed to electric wires that constitute the second wire harness, and
the second wire harness is attached to the first wire harness so that the first wire harness and the second wire harness are arranged on a front or a rear surface of the plate member.

3. The wire harness according to claim 1,
wherein the clamp has a pressing portion that protrudes in a direction that intersects a direction in which the clamp is fitted into the fitting portion, and presses against the fitting portion.

4. The wire harness according to claim 1,
wherein the first wire harness is a part that is the same for a variety of types of wire harnesses, and
the second wire harness is a part that is added in accordance with a product number to the first wire harness.

* * * * *